US005360197A

United States Patent [19]

Reiter et al.

[11] Patent Number: 5,360,197

[45] Date of Patent: Nov. 1, 1994

[54] ELECTROMAGNETICALLY OPERATED INJECTION VALVE

[75] Inventors: Ferdinand Reiter, Markgroeningen; Martin Maier, Moeglingen, both of Germany

[73] Assignee: Robert Bosch GmbH, Stuttgart, Germany

[21] Appl. No.: 39,191

[22] PCT Filed: Sep. 2, 1992

[86] PCT No.: PCT/DE92/00727

§ 371 Date: Apr. 14, 1993

§ 102(e) Date: Apr. 14, 1993

[87] PCT Pub. No.: WO93/06360

PCT Pub. Date: Apr. 1, 1993

[30] Foreign Application Priority Data

Sep. 21, 1991 [DE] Germany .............................. 4131500

[51] Int. Cl.[5] ....................... F16K 31/02; F02M 51/06

[52] U.S. Cl. ............................... 251/129.21; 251/337; 239/585.4

[58] Field of Search ........................... 251/129.21, 337; 239/585.1, 585.4, 585.5

[56] References Cited

U.S. PATENT DOCUMENTS

| | | | |
|---|---|---|---|
| 189,153 | 4/1877 | Towle et al. | 251/337 |
| 4,944,486 | 7/1990 | Babitzka | 251/129.21 |
| 5,301,874 | 4/1994 | Vogt et al. | 239/585.4 |

FOREIGN PATENT DOCUMENTS

| | | |
|---|---|---|
| 4013926 | 12/1990 | Germany . |
| 91-11604 | 8/1991 | WIPO . |
| 91-11611 | 8/1991 | WIPO . |

*Primary Examiner*—John Rivell

*Attorney, Agent, or Firm*—Edwin E. Griegg; Ronald E. Greigg

[57] ABSTRACT

An electromagnetically operated injection valve including a return spring having upper and lower ends, the upper and lower spring ends are bent to extend axially and parallel with a valve's longitudinal axis. The upper end of the spring engages a recess of a fixed setting bushing, and the lower end engage in a recess of a needle sleeve so as to prevent twisting. Due to the position of a valve seat body relative to the valve closing member the same angle is maintained throughout the life of the assembly, the adaptation process of both components is reduced to a single running-in phase. The new injection valve is particularly suitable as an injection valve for fuel injection units of mixture compressing spark ignited internal combustion engines.

10 Claims, 2 Drawing Sheets

ELECTROMAGNETICALLY OPERATED INJECTION VALVE

PRIOR ART

The invention is based on an electromagnetically operated injection valve as set forth hereinafter. The opening movement of a valve closing member which acts in conjunction with a valve seat is effected by an armature within the magnetic field of an energized coil, via a needle bushing connected with the same, while the closing movement is generated by a return spring which acts via the needle sleeve on the valve closing member, which is fixedly connected with the sleeve.

A return spring is known (U.S. Pat. No. 4,944,486), which is supported on a flat front face of a setting bushing which is pressed into the flow hole of the valve core and acts on the valve closing member via the needle sleeve, in which arrangement a standard cylindrical coil spring is used, both ends of the coil are ground flat in order to obtain even wear of the support faces. The return spring is subjected to compression and, like the needle sleeve and the valve closing member, is arranged so that it can be rotated relative to the core in the flow hole.

The hydraulic forces acting on the valve closing member in the circumferential direction effect a twisting movement relative to the valve seat body, which is only partially prevented by the frictional forces which occur on the relevant contact surfaces between, the rotatable return spring and the fixed setting bush, and the return spring and the needle sleeve, and which occur due to the movement of the components concerned relative to each other.

Due to the twisting of the valve closing member relative to the valve seat body, the seating surfaces have to adapt continuously to each other, which leads to a change of the initially set valve stroke. The change of the valve stroke causes the amount of fuel which is injected per stroke to vary, thereby worsening the running behaviour and fuel consumption of the internal combustion engine.

ADVANTAGES OF THE INVENTION

In contrast, the electromagnetically operated injection valve in accordance with the invention has an advantage that twisting of the valve closing member relative to the valve seat body is prevented in a simple manner by a form-fit connection in the circumferential direction of the return spring with the fixed setting bushing and the needle sleeve.

The valve seat body and the valve closing member are thus arranged to maintain the same angle relative to each other, so that the valve stroke remains unchanged once the two sealing surfaces have adapted to each other. The amount of fuel injected per stroke remains constant over the entire life of the valve.

The measures listed herein facilitate advantageous developments and improvements of the injection valve specified hereinafter.

An embodiment of particular advantage is one in which the ends of the return spring are bent towards the longitudinal valve axis, so that the sharp edged spring ends, when inserted into the flow hole, do not scrape along its upper surface, thereby eliminating the risk of any fragments impairing the function of the injection valve. A complete U-shaped bending of the spring ends in the direction of the valve's longitudinal axis prevents the return springs from hooking into each other, for example in transport containers, which would necessitate their disentanglement prior to assembly.

DRAWING

Embodiment examples of the invention are shown simplified in the drawing and are more closely described in the description which follows.

FIG. 1 shows a fuel injection valve designed in accordance with the invention, FIGS. 2 to 5 show an embodiment example of different embodiments of a return spring in accordance with the invention.

DESCRIPTION OF THE EMBODIMENT EXAMPLES

Figure 1:
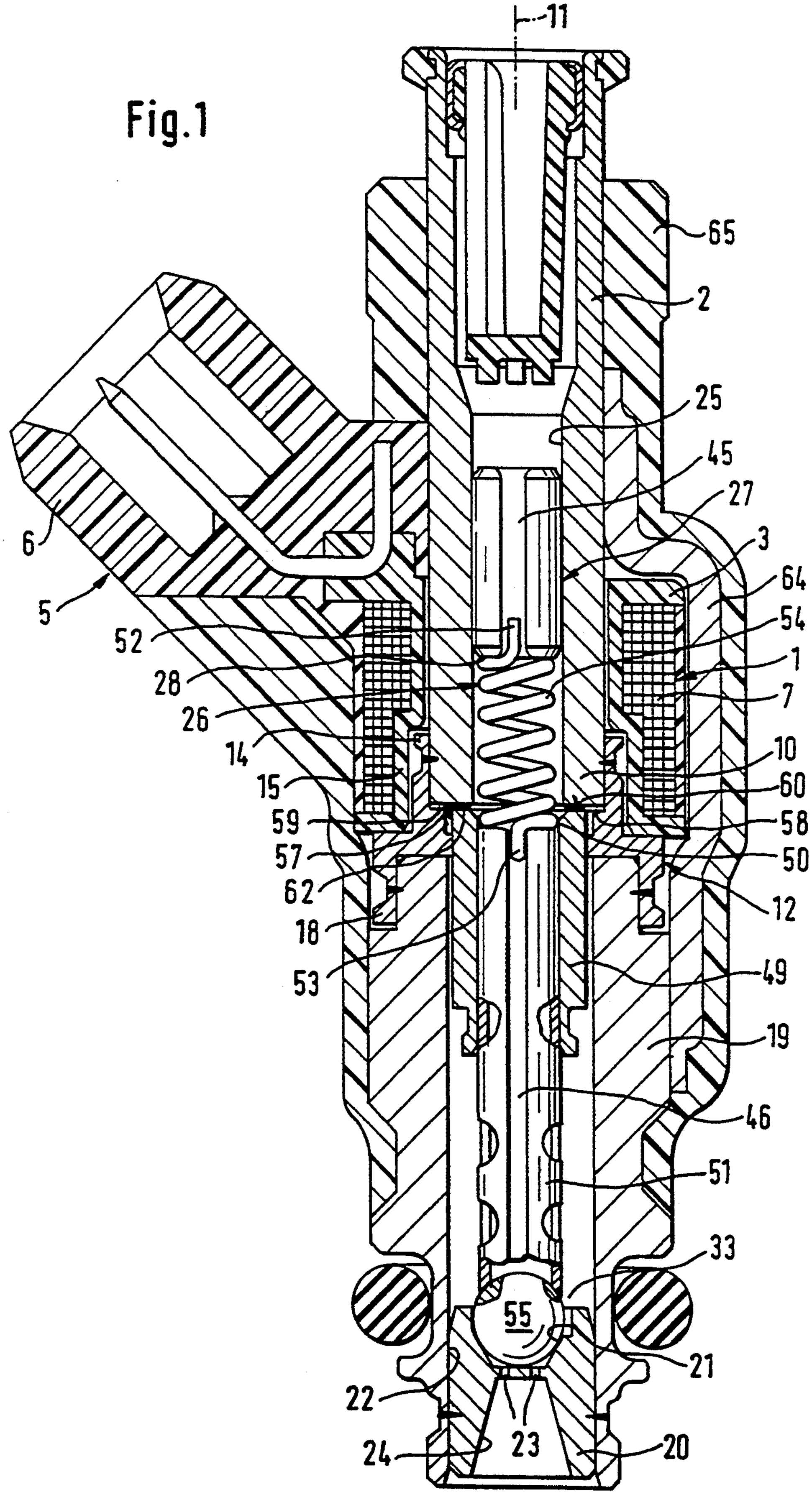

The injection valve, shown in FIG. 1 of the drawing as an example of an electromagnetically operated injection valve for fuel injection units, in particular of mixture compressing spark ignited internal combustion engines has a core 2 which is surrounded by the magnetic coil 1 and which is used as a fuel filler neck. The magnetic coil 1 with a coil body 3 is provided with a plastic moulding 5, which has an electrical connection plug 6 integrally moulded onto it. The coil body 3 of the magnetic coil 1 which is radially stepped carries windings 7, also radially stepped. A tubular metallic intermediate part 12 is connected to the lower core end 10, concentric with the valve's longitudinal axis 11 of the core 2, by welding, and partially covers the core end 10 axially with an upper cylinder section 14. The stepped coil body 3 partially overlaps the core 2 and with a step 15 of a larger internal diameter, the upper cylinder section 14 of the intermediate part 12. At the end facing away from the core 2, the intermediate part 12 is provided with a lower cylinder section 18 which overlaps a tubular jet carrier 19, to which it is sealed by welding. A cylindrical valve seat body 20 is sealed by welding into the downstream end of the jet carrier 19, in a through-hole 22 which extends concentrically with the valve's longitudinal axis 11. The valve seat body 20 has a fixed valve seat 21 facing the magnetic coil 1, downstream from which two injection orifices 23 are provided in the valve seat body 20. Downstream from the injection orifices 23, the valve seat body 20 has a processing hole 24 which expands in the flow direction in the manner of a truncated cone.

A tubular setting bush 27 is pressed into a stepped flow hole 25 of the core 2, which extends concentrically with the valve's longitudinal axis 11, for the purpose of setting the spring force of a return spring 26. The return spring 26, for example a helical spring, rests with one end on a front face 28 of the setting bush 27 which faces the valve seat body 20. The insertion depth of the setting bush 27 into the flow hole 25 of the core 2 is determined by the force of the return spring 26 and thus also influences the dynamic fuel volume which is delivered during the opening and closing stroke of the injection valve.

With the end which faces the setting bush 27, the return spring 26 is supported in the downstream direction on a front face 50 of a needle sleeve 51.

Figure 2:
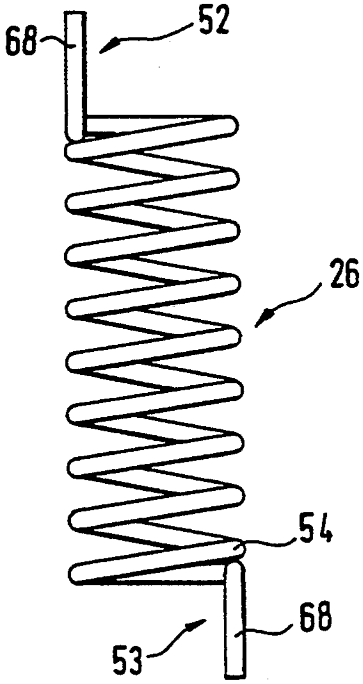

Two opposing spring ends 52, 53 of the return spring 26 are bent opposite a spring coil 54 of the return spring 26 over a length which equates to three quarters of a turn, parallel with the valve's longitudinal axis 11, as shown more clearly in FIG. 2. The bent spring ends 52, 53 which extend in the continuation of the circumference of the return spring 26 may extend such that they are in alignment with each other or are twisted by an angle relative to each other.

Figure 3:
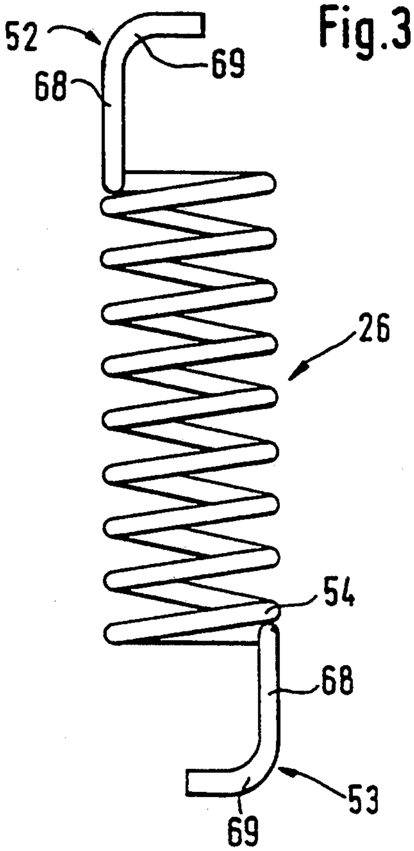
Figure 4:
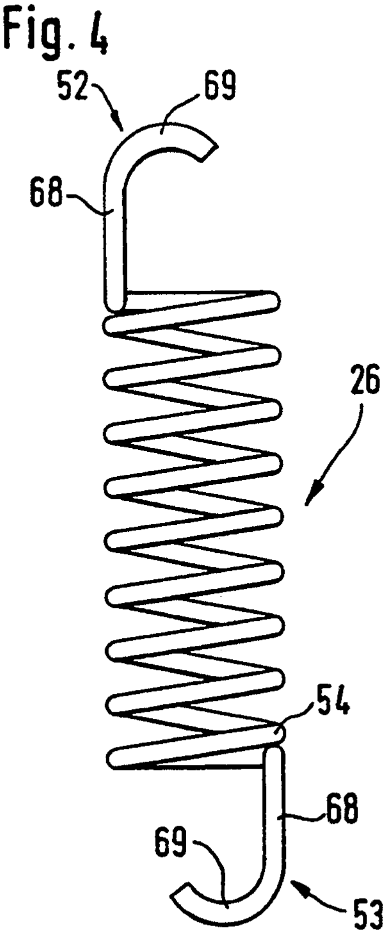
Figure 5:
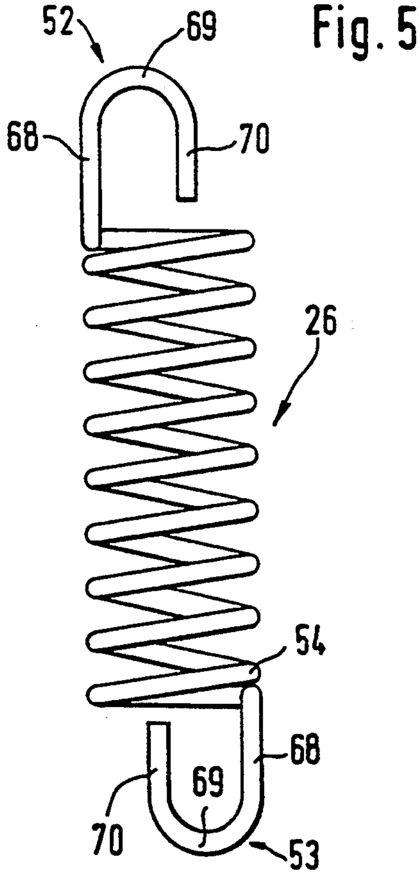

A further distortion, as shown in FIGS. 3 and 4, prevents any fragments which may arise during assembly due to scraping by the sharp edged spring ends 52, 53 on the surface of the flow hole 25 from impairing the function of the valve. For this purpose, a transverse section 69 of the spring end 52, 53 is designed in the construction in accordance with FIG. 3 on a longitudinal section 68 which extends parallel with the longitudinal axis 11, which extends transversely to the longitudinal section into the interior of the return spring 26. The transverse section 69 may for example have an almost straight form, as shown in FIG. 3, or it may be bent towards the windings, as shown in FIG. 4. A 'U' shaped configuration of the spring ends 52, 53, shown in FIG. 5, such that a longitudinal section 68 which extends parallel with the valve's longitudinal axis 11 on the circumference of the return spring 26 is followed by an arc shaped transverse section 69 which is turned towards the valve's longitudinal axis 11 and which has a diameter which corresponds to the radius of the spring coil 54 and terminates in a longitudinal section 70, which is parallel with the valve's longitudinal axis 11 and which ends shortly before that winding of the return spring 26 nearest to the section 70, provides the further advantage that the spring ends 52, 53 of the return springs 26 will not hook into each other.

The spring end 52 which is directed upstream engages in a manner to exclude any twisting, in a corresponding recess 45 of the setting bush 27 which is arranged eccentrically, parallel with the valve's longitudinal axis 11, and which is designed as a slot which extends over the entire length of a wall of the setting bushing. The downstream orientated spring end 53 engages in the same manner in a corresponding recess 46 of the needle sleeve 51 which is arranged equally eccentric, parallel with the valve axis 11 and which is designed as a slot which extends over the entire length of a wall of the needle sleeve 51.

The design and arrangement of the return spring 26 in accordance with the invention facilitates the transfer of reaction forces which are directed opposite to the hydraulic forces acting on the valve closing member 55 in the circumferential direction, so that the position of the valve seat body 20 relative to the valve closing member 55 is guaranteed to be constant in the circumferential direction. Due to the bent or 'U' shaped design of the spring ends 52, 53, any hook-up of the return spring 26, for example during transportation, and a release of fragments from the surface of the flow hole 25 during assembly is prevented.

The surface roughnesses which exist on the surface of the valve seat 21 and the valve closing member 55 will smooth out during the initial running period, whereby the valve stroke will slightly alter. This adaptation process will be reduced to a single running-in phase in the injection valve in accordance with this invention.

A tubular armature 49 is connected by welding to that end of the needle sleeve 51 which faces the return spring 26. Between a front face 57 of the core end 10 which faces the armature 49, and a shoulder 58, which leads to the upper cylinder section 14, of the intermediate part 12, an axial gap 59 is provided, in which—forming a residual air gap between a supply side front face 60 of the armature 49 and the front face 57 of the core end 10—a non-magnetic stop disc 62 is clamped in position, which limits the stroke of the valve closing member 55 during the opening action of the valve.

The magnetic coil 1 is at least partially surrounded by at least one conductive element 64 which is designed as a stirrup and which serves as a ferromagnetic element and which rests with one end on the core 2 and with the other end on the jet support 19 to which it is connected by welding or soldering.

A part of the valve is enclosed by a plastic casing 65 which, starting from the core 2, extends in an axial direction via the magnetic coil 1 with the connection plug 6 and the at least one conductive element 64.

We claim:

1. An electromagnetically operated injection valve for fuel injection units of internal combustion engines, comprising a metal core extending along a valve's longitudinal axis, a magnetic coil and an armature through which a valve closing member acting in conjunction with a fixed valve seat is operated, and a cylindrical setting bushing pressed into the core which is designed concentrically with the valve's longitudinal axis, on which setting bushing a return spring is supported which engages on a needle sleeve which is connected to the valve closing member, the return spring (26) is bent at upper and lower opposite (52, 55) ends, in which arrangement the upper spring end (52) which faces the setting bush (27) engages in a recess (45) of the setting bushing (27) and the lower spring end (53) which faces the needle sleeve (51) engages in a recess (46) of the needle sleeve (51) in a form-locking manner in the circumferential direction.

2. An injection valve in accordance with claim 1, in which said upper and lower spring ends (52, 53) of the return spring (26) have a straight-lined longitudinal section (68) which extends parallel with the valve's longitudinal axis (11).

3. An injection valve in accordance with claim 2, in which a transverse section (69), directed into the interior of the return spring (26), follows on from upper and lower longitudinal sections (68).

4. An injection valve in accordance with claim 3, in which the transverse section (69) is arc shaped.

5. An injection valve in accordance with claim 4, in which a straight-lined longitudinal section (70) which is parallel with the valve's longitudinal axis (11), follows on from the upper and lower longitudinal section (69).

6. An injection valve in accordance with claim 1, in which the upper and lower spring ends (52, 53) are arranged in alignment with each other or offset relative to each other.

7. An injection valve in accordance with claim 2, in which the upper and lower spring ends (52, 53) are arranged in alignment with each other or offset relative to each other.

8. An injection valve in accordance with claim 3, in which the upper and lower spring ends (52, 53) are arranged in alignment with each other or offset relative to each other.

9. An injection valve in accordance with claim 4, in which the upper and lower spring ends (52, 53) are arranged in alignment with each other or offset relative to each other.

10. An injection valve in accordance with claim 5, in which the upper and lower spring ends (52, 53) are arranged in alignment with each other or offset relative to each other.

* * * * *